L. Chapman,
Gang Plow.

No. 113,627. Patented Apr. 11, 1871.

Witnesses.

Inventor.
Luke Chapman
By W. E. Simonds Atty

UNITED STATES PATENT OFFICE.

LUKE CHAPMAN, OF COLLINSVILLE, CONNECTICUT, ASSIGNOR TO HIMSELF AND THE COLLINS COMPANY.

IMPROVEMENT IN GANG-PLOWS.

Specification forming part of Letters Patent No. 113,627, dated April 11, 1871.

I, LUKE CHAPMAN, of Collinsville, in the county of Hartford and State of Connecticut, have made certain Improvements in Gang-Plows, of which the following is a specification:

Nature and Objects of the Invention.

My improvement is an attachment to a gang-plow formerly patented by me, Letters Patent numbered 92,016, and dated June 29, 1869.

The object of the attachment is to assist the person who is operating the gang-plow and riding thereon in raising the plows from out of the ground while the gang is moving forward, which improvement is outlined in a caveat filed by me in the Patent Office of the United States April 27, 1870.

Description of the Accompanying Drawing.

Figure 1:
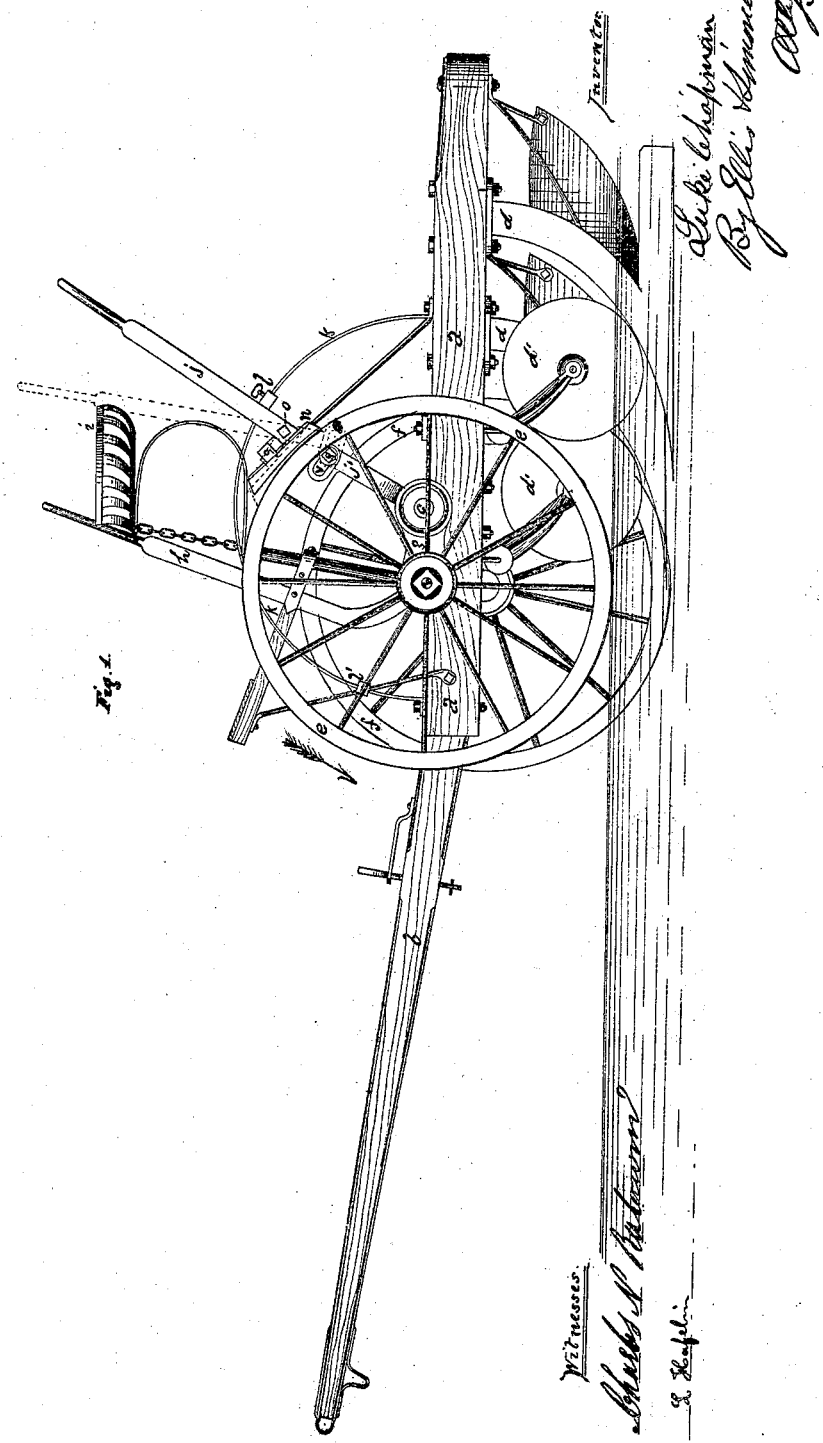
Figure 2:
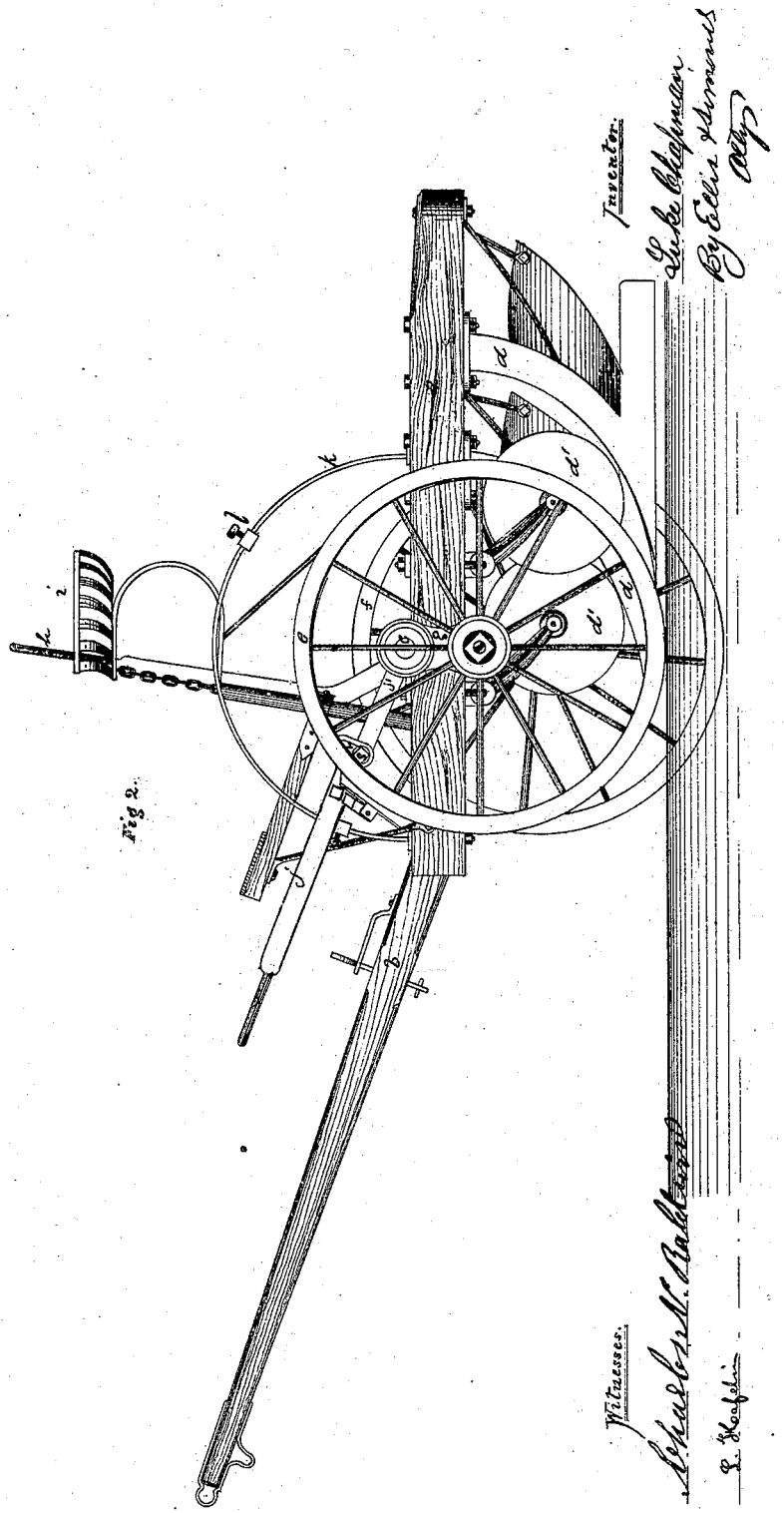
Figure 3:
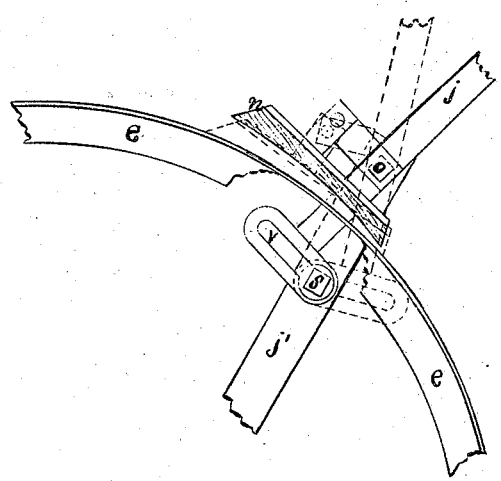
Figure 4:
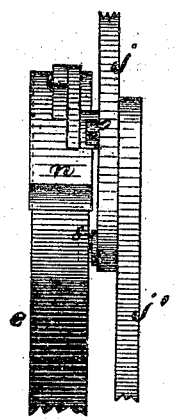

Figure 1 is a side elevation of the gang-plow in position for regular work, the land-wheel (which runs upon the unbroken soil) being next the observer. Fig. 2 is a similar side elevation, with the plows raised from out the ground for passing an obstruction. Fig. 3 is a detached side view of the parts, hereinafter specifically claimed herein, in detail. Fig. 4 is a rear view of the part shown in Fig. 3.

General Description.

The letter $a$ indicates the wooden frame of the machine; $b$, the pole to which the horses are hitched; $c$, the main axle, to which the frame $a$ is hung.

The axle may be of any desired length, thereby allowing as much width of frame as is desired, and any desired number of plows. For convenience' sake but two plows, $d\ d$, are shown. $d'\ d'$ are rolling colters.

When the gang-plow is at work the wheel $f$ always runs in the furrow, (except when the first furrow is taken,) and is known herein as the "furrow-wheel."

The wheel $e$ always runs upon the unbroken soil, and is known herein as the "land-wheel."

The wheel $e$ is attached to one end of the axle $c$ by the arm $g$, which is rigid upon the axle. The wheel $f$ is attached to the opposite end of the main axle by two arms, both, usually, but not necessarily, of the same length as the arm $g$. One of them is rigidly attached to the main axle $c$, precisely as is the arm $g$, and extends in the same direction. At its farther extremity is jointed the second of the two arms just referred to, and at the farther extremity of this second arm is attached the wheel $f$.

This last-mentioned arm vibrates, with reference to the rigid arm to which it is attached, usually a quarter of a circle, but admitting of various extensions and changes according to various conditions and circumstances; and its movements are controlled by the lever $h$, which, being on the right hand of the operator riding in the seat $i$, is known herein as the "right-hand lever."

The left-hand lever $j$ is attached directly to the main axle $c$, and plays upon the clamping-segment $k$, the length of its play being determined by the screw-stops $l\ l'$. The lever $h$ plays upon a similar clamping-segment, and its movements are controlled by similar stops.

The various positions of adjustment into which the plows can be put by the operation of these levers are all thoroughly described in the Letters Patent above referred to; but it is not necessary, for the purposes of this specification, to make extended mention of them here.

It is enough to say that the most important positions of adjustment are four in number, namely:

First, throw both the levers well forward, so that the arm $g$ and its counterpart on the opposite end of the axle point straight down, and the loose arm, to which the wheel $f$ is attached, lies in a horizontal direction, and the gang-plow is in adjustment for transportation. The two wheels both run on the same level, and the frame meanwhile lying level, the plows are raised somewhat from the surface of the ground, so that the machine can be readily drawn about on common roads and the like.

Second, throw both the levers well back, the lever $i$ as far back as shown in Fig. 1, the lever $h$ as far back on its own clamping-segment, and the machine is put into adjustment for taking the first furrow—that is, the plows are thrown below the level of both wheels.

Third, adjust the levers as shown in Fig. 1, and you have the plows in adjustment for regular work. The first furrow having been taken, the land-wheel is raised above the furrow-wheel by just the depth of the furrow, and the bottoms of the plows are on the same level with the bottom of the furrow-wheel.

Fourth, let the lever $h$ remain as last adjusted and bring the lever $j$ forward, as shown in Fig. 2, and the plows are in adjustment for passing an obstacle while at work. The furrow-wheel still remains below the land-wheel, while the plows are raised above the surface of the unbroken soil.

To effect the change of adjustment from the third position described to the fourth, the operator meanwhile riding in his seat, will obviously require the expenditure of a great deal of strength by the operator, as in pulling the lever $j$ forward he has not only to raise the plows, but himself also.

So far the description of this gang-plow coincides with that given in the specification of these Letters Patent referred to.

I will now describe the improved attachment I have made, which renders it easy for the operator to effect this change of adjustment.

Previous to the invention which is intended to form the subject of these Letters Patent, the lever $j$ was one continuous piece from its handle down to the main axle $c$. Now this lever is made in two parts, the upper part, $j$, jointed to the lower part, $j'$, by the pin $o$. The lower end of the part $j$ has a sidewise enlargement, containing a slot, $v$, which plays upon the pin $s$, driven into the part $j'$. The length of this slot determines, of course, the length of the play of the upper part, $j$, upon the lower part, $j'$. To the outside of the part $j'$ is pivoted the clamp $n$, overhanging the face or tread of the wheel $e$. When the left-hand lever is adjusted as shown in Fig. 1, the weight of the part $j$ will naturally throw that part as far back as the slot $v$ will permit, and the clamp $n$ will lie slightly raised from off the face of the wheel $e$. Now, when the operator wishes to change the adjustment from that shown in Fig. 1 to that shown in Fig. 2, he grasps the handle of the part $j$ and brings it forward to the position indicated in dotted lines. This throws the clamp down upon the wheel, (also shown in dotted lines,) which, being in motion in the direction indicated by the arrow, will, if the clamp is steadily held down upon the wheel, by its own motion and force bring the lever forward in the position shown in Fig. 2.

*Claims.*

I claim as my invention—

1. In a gang-plow, the combination of the parts $j$ and $j'$ and the clamp $n$ with the wheel $e$, the whole constructed, arranged, and operated substantially as and for the purposes set forth.

2. The combination of the frame $a$, cranked axle $c$, jointed lever $j\ j'$, clamp $n$, and wheels $e$ and $f$, as parts of a gang-plow, the whole constructed, arranged, and operated substantially as and for the purposes set forth.

LUKE CHAPMAN.

Witnesses:
J. H. BIDWELL,
ALBERT L. THAYER.